US012208956B2

(12) United States Patent
Banovich et al.

(10) Patent No.: US 12,208,956 B2
(45) Date of Patent: Jan. 28, 2025

(54) FLUID SUBSTANCE DISPENSING DEVICE

(71) Applicant: Coster Tecnologie Speciali S.p.A., Calceranica Al Lago (IT)

(72) Inventors: Yuri Banovich, Lavarone (IT); Alfeo Tecchiolli, Meano (IT); Leonardo Righi, Arco (IT)

(73) Assignee: Coster Tecnologie Speciali S.p.A., Calceranica Al Lago (IT)

( * ) Notice: Subject to any disclaimer, the term of this patent is extended or adjusted under 35 U.S.C. 154(b) by 572 days.

(21) Appl. No.: 17/495,201

(22) Filed: Oct. 6, 2021

(65) Prior Publication Data

US 2022/0106103 A1 Apr. 7, 2022

(30) Foreign Application Priority Data

Oct. 6, 2020 (IT) ........................ 102020000023515

(51) Int. Cl.
*B65D 83/20* (2006.01)
*B05B 1/34* (2006.01)

(52) U.S. Cl.
CPC ............ *B65D 83/205* (2013.01); *B05B 1/341* (2013.01); *B65D 83/20* (2013.01)

(58) Field of Classification Search
CPC ........ B65D 83/205; B65D 83/20; B05B 1/341
See application file for complete search history.

(56) References Cited

U.S. PATENT DOCUMENTS 3,610,479 A * 10/1971 Venus, Jr. ............ B65D 83/206 222/530
3,937,368 A * 2/1976 Hoagland ............ B65D 83/205 222/402.11
4,011,970 A * 3/1977 Crowle ................ B65D 83/206 239/333
4,057,176 A * 11/1977 Horvath ............ B05B 11/00442 222/321.9
4,187,963 A * 2/1980 Mascia ................ B65D 83/205 222/402.13

(Continued)

FOREIGN PATENT DOCUMENTS

EP 0538543 A1 4/1993
EP 0663240 A1 7/1995

(Continued)

*Primary Examiner* — Frederick C Nicolas
(74) *Attorney, Agent, or Firm* — Dickinson Wright PLLC; Andrew D. Dorisio

(57) ABSTRACT

A device for dispensing a fluid substance, including a container in which the fluid substance is housed, the container being coupled with a valve or a manual pump equipped with a hollow stem which is movable between at least a first position, in which the fluid substance is dispensed through a cavity thereof and a second position in which dispensing of the fluid substance through its cavity is prevented, there being a dispenser button coupled, in an essentially sealed manner, at the top of the hollow stem so that application of pressure to the button moves the hollow stem between the said second and the said first position, the button defining a delivery channel endowed with a first opening in a free surface of the device and which is equipped with a surface facing the stem cavity; the surface is conical or pyramidal, being tapered towards the stem cavity.

9 Claims, 3 Drawing Sheets

(56) References Cited

U.S. PATENT DOCUMENTS 4,991,747 A * 2/1991 Van Brocklin ..... B05B 11/1097 417/446
5,137,180 A * 8/1992 Kieras .................... B65D 83/46 239/573
6,260,738 B1 * 7/2001 Kerr ..................... B65D 83/205 222/402.13
6,454,139 B1 * 9/2002 Bayer .................. B65D 83/206 222/402.13
6,695,176 B1 * 2/2004 Nazari .................. B05B 11/106 222/321.9
7,017,785 B2 * 3/2006 Lasserre .............. B65D 83/205 222/402.23
7,104,427 B2 * 9/2006 Pericard ............... B65D 83/205 222/402.11
7,143,959 B2 * 12/2006 Smith .................... B65D 83/20 239/354
7,611,032 B2 * 11/2009 Brunerie ................ B65D 83/22 222/402.11
7,699,190 B2 * 4/2010 Hygema .............. B65D 83/205 222/402.11
8,540,121 B2 * 9/2013 Walters .................. B65D 83/56 222/153.1
9,216,852 B2 * 12/2015 Cho ....................... B65D 83/22
11,130,143 B2 * 9/2021 Fore .......................... B05B 1/30
11,787,618 B2 * 10/2023 Justus .................. B65D 83/206 222/402.13

FOREIGN PATENT DOCUMENTS

EP 0826608 A1 3/1998
FR 1158992 A 6/1958
MX PA03006737 A 2/2004
ZA 0538543 A1 * 11/1992 ........... B05B 1/3436

* cited by examiner

FLUID SUBSTANCE DISPENSING DEVICE

This application claims priority to Italian Patent Application for Invention No. 102020000023515 filed on Oct. 6, 2020, the disclosure of which is incorporated herein by reference.

FIELD OF THE INVENTION

The present invention relates to a device for dispensing a fluid substance.

In particular, it refers to a device for dispensing a fluid substance contained under pressure within an aerosol-type can, or which is pressurised upon dispensing by means of a manual pump coupled with the substance container.

BACKGROUND ART

There are different types of fluid substance dispensing devices on the market, for fluids including deodorants, perfumes, rooms fresheners, insecticides, etc.

Upon dispensing at least, the fluid substance is sent, under pressure, to a nozzle that nebulises it in order to create a very fine, homogeneous spray.

It should be noted that before being sent to the nozzle, the fluid substance may be pressurised using a hand-operated pump. In this case, it is the said force applied by the user pushing a dispenser button and activating the pump which sends the substance under pressure through a hollow stem to the nozzle.

Systems of the type commonly known as aerosols are also known. In this case, the substance is already pressurised inside a container and the user's action simply opens a valve which then allows the substance to reach the nozzle (again through a hollow stem).

The nozzles of the commonly known kind are rather complex as they have to generate a considerable turbulence in the substance to be dispensed in order to create homogeneous vaporisation.

They generally include a pad that is pressure-fitted in a special seat made in the dispenser button, right next to a substance delivery channel outlet.

The system works well.

Nevertheless, the production (generally involving moulding) and the fastening of the pad to the dispenser button is expensive and significantly impacts the cost of the finished device.

SUMMARY OF THE INVENTION

The object of the present invention is to provide a fluid substance dispensing device which is improved compared with the prior art.

A further object of the invention is to provide a fluid substance dispensing device which is cheaper than those currently available on the market.

A still further object of the present invention is to provide a device for dispensing a fluid substance which minimises the operations required to assemble the various pieces in order to obtain the device in its final configuration.

This and other objects are achieved by means of a fluid substance dispensing device produced according to the technical teachings of the appended claims.

BRIEF DESCRIPTION OF THE FIGURES

Further features and advantages of the innovation will become clearer in the description of a preferred but not exclusive embodiment of the device, illustrated—by way of a non-limiting example—in the drawings annexed hereto, in which.

DETAILED DESCRIPTION OF THE INVENTION

With reference to the figures stated, reference number 1 is used to denote, as a whole, a fluid substance dispensing device.

Figure 1:
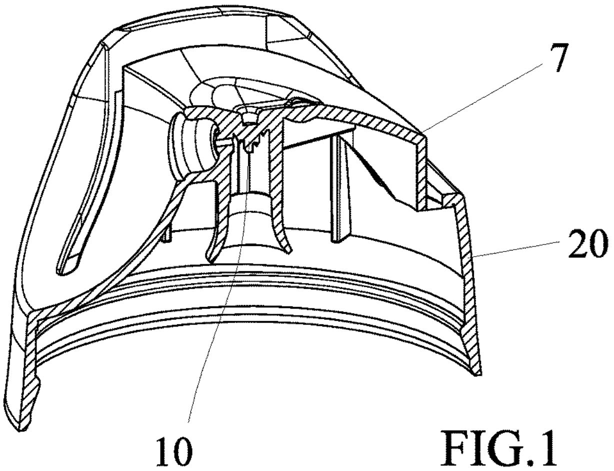
FIG. 1 is a perspective section view of a part of the device according to the present invention.
Figure 2:
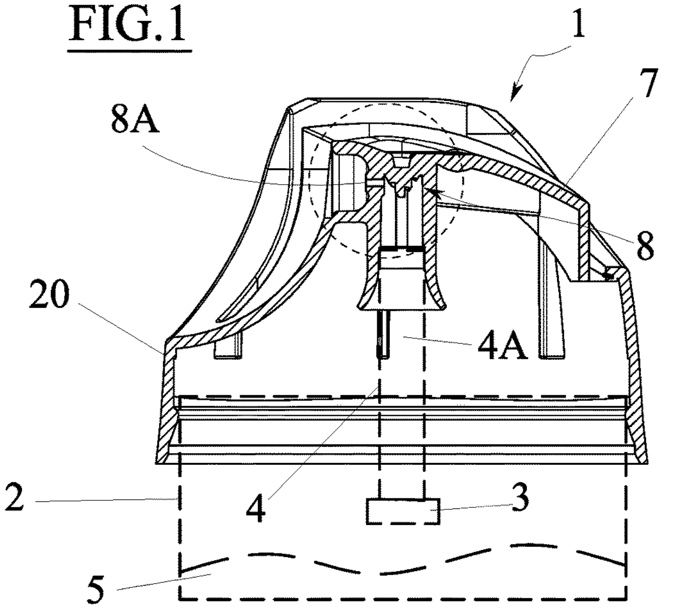
FIG. 2 is a side section of the device according to the present invention, in which some parts are shown schematically.

Reference should initially be made to FIG. 2, in which some parts of the device 1 are shown schematically with dashed lines.

The device 1 for dispensing a fluid substance 5, comprises a container 2 in which the fluid substance 5 is housed. The fluid substance can be housed directly inside the container 2, or it may be contained in a deformable bag.

Figure 7:
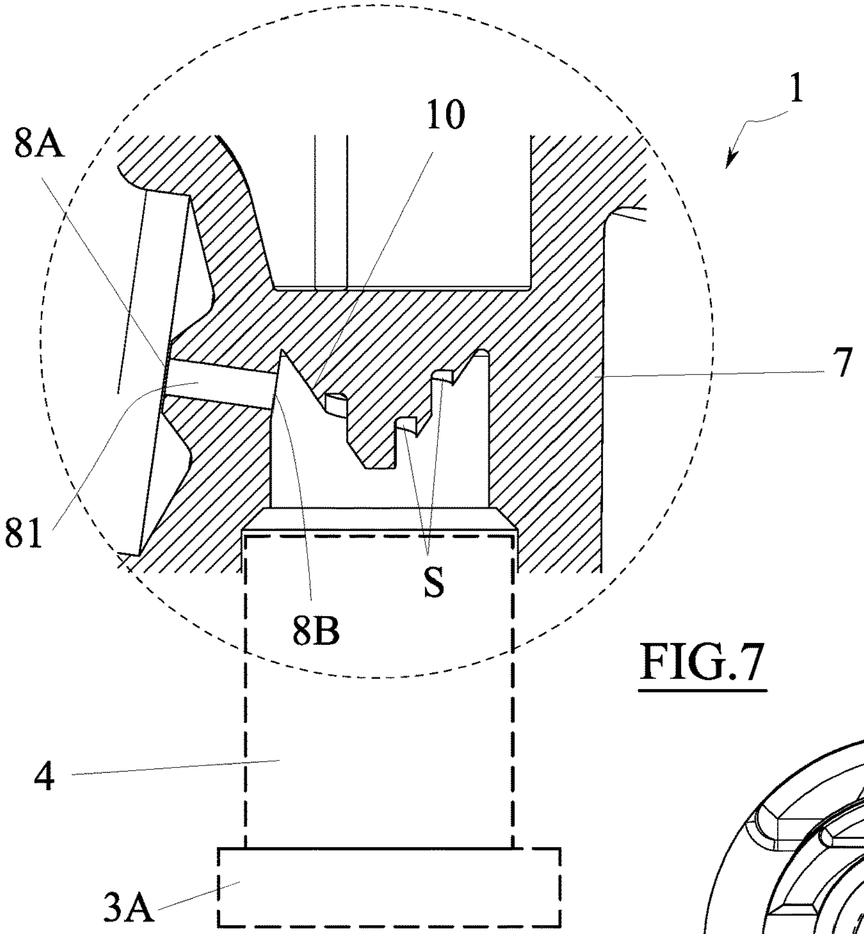
FIG. 7 is the enlarged detail circled in FIG. 6, in which other parts of the device are shown schematically.
Figure 8:
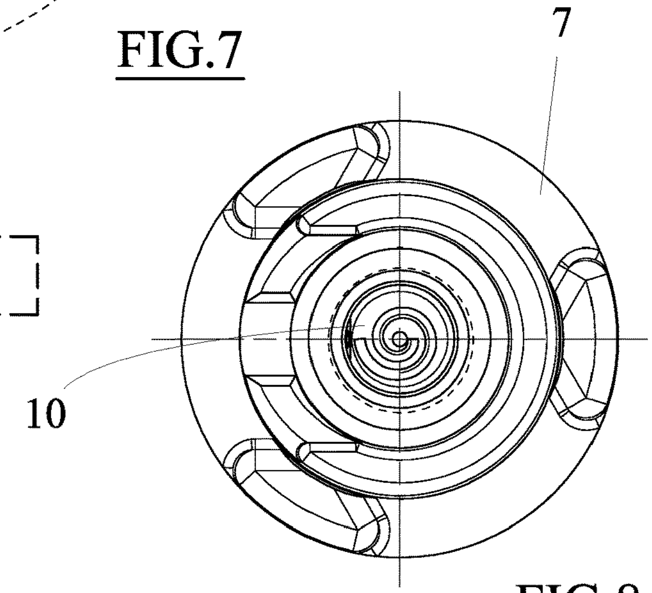
FIG. 8 is a bottom-up view of the part in FIG. 6.

The container 2 may be coupled to a valve 3, as shown in FIG. 2, or a manual pump 3A, as shown in FIG. 7 (but the dispensing cap in FIG. 7 may also be fitted on a valve stem).

If there is a valve 3 present, the container 2 is pressurised, whether the fluid substance is contained directly inside the container or whether it is housed within a deformable bag; in the second case, the pressurisation occurs outside the bag.

If there is a pump 3A present, the vessel may not be pressurised.

Essentially, the pump or valve is equipped with a hollow stem 4 which is movable between at least a first position, in which the fluid substance 5 is dispensed through a cavity 4A thereof, and a second position, in which the dispensing of the fluid substance through the cavity thereof is prevented.

At the top (or free end) of the hollow stem 4, there is a dispensing button 7 coupled, essentially in a sealed manner, so that the application of pressure to the said button 7 moves the hollow stem 4 between the said second and the said first position.

In the configuration in FIG. 2, the button 7 is hinged to a base 20 which is fastened (for example by means of a snap mechanism) to the container 2. The base 20 and the button 7 can be made in a single moulded piece.

Figure 6:
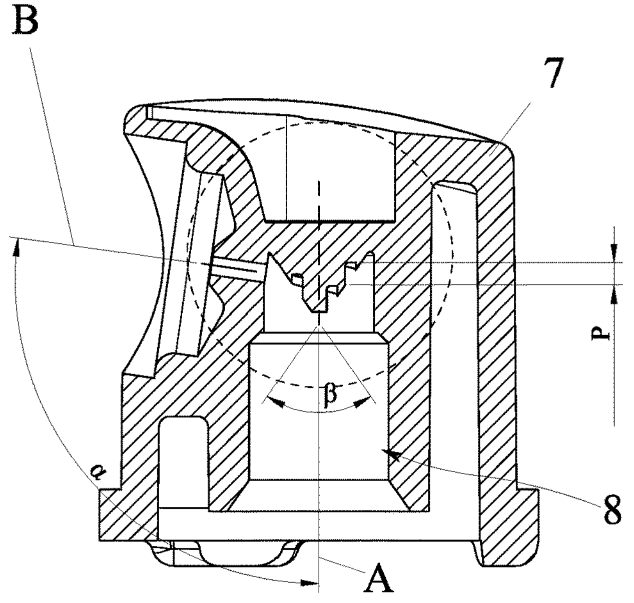
FIG. 6 is a section view of a variant of the part of the device in FIG. 1.

In the configuration in FIG. 6, on the other hand, the button 7 is completely supported directly on the stem 4, and there is no base 20. The button 7 may be formed in a single piece.

In the present wording, the term "essentially sealed", when referring to the coupling between the base and the stem, means that the coupling must prevent or minimise leakage of the fluid substance at the said coupling, at least during dispensing of the fluid substance.

Figure 3:
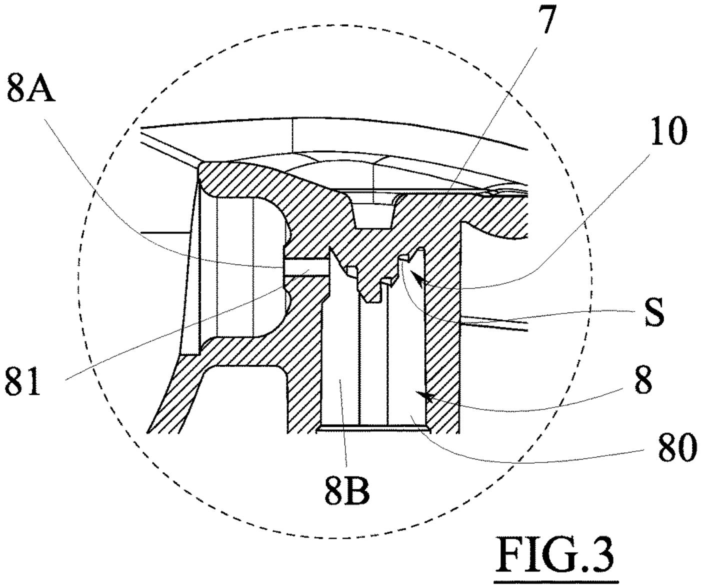
FIG. 3 is the enlarged detail circled in FIG. 2.
Figure 4:
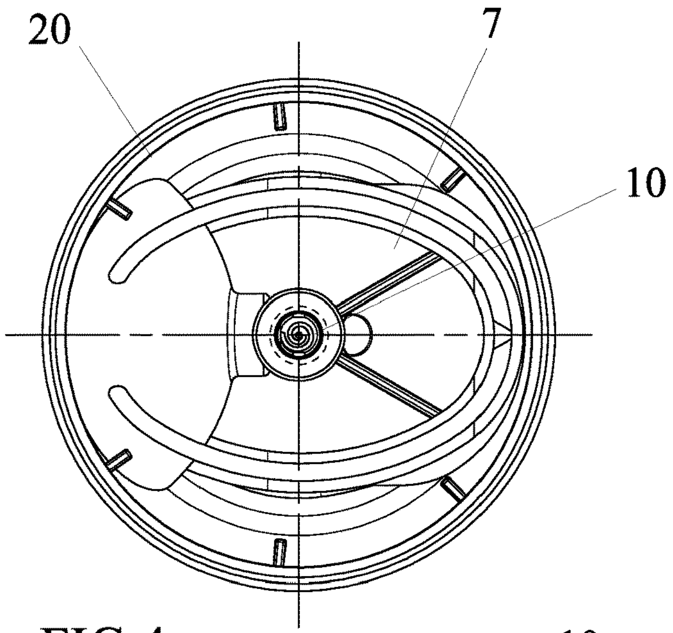
FIG. 4 is a simplified bottom view of the part shown in FIG. 1.

Going back to FIGS. 2 and 3, it can be seen that the button 7 defines a delivery channel 8 endowed with a first opening 8A in a free surface of the device 1 (at a dispensing area).

The channel 8 is also endowed with a surface 10 facing the stem cavity 4A.

According to the present invention, the surface 10 is conical or pyramidal, being tapered towards the stem cavity.

The surface 10 may be integrally formed with the button 7 (i.e. formed in a single piece). The button 7 may be formed in a single piece, preferably of injection moulded plastic.

The conical surface may be a solid of rotation obtained by rotating a right-angled triangle around one of its cathetuses. The axis of the cone may be the cathetus around which the solid is constructed; the base of the cone is also the circle obtained by the rotation of the other cathetus. Finally, the vertex of the cone is the point of the axis opposite the intersection with its base.

A cone may be considered to be a pyramid with a circular base, therefore having an infinite number of oblique faces.

A pyramid (or pyramidal surface) is defined as a polyhedron consisting of a polygonal face, known as the base, and a vertex which does not lie on the same plane as the base and which is sometimes known as the apex of the pyramid. Its edges are the sides of the base polygon and the line segments bounded by the apex and each of the vertices of the base. The faces of the pyramid include the base thereof and the triangular faces (known as the lateral faces) which have the apex of the pyramid as their apex.

In the present invention, the pyramidal surface may, therefore, consist of a polygonal base and from four to very many (an infinite number) sides, thus "degenerating" into a conical surface, as defined above.

The delivery channel can comprise a first portion 80 (with a radius which is essentially comparable to the external radius of the stem) which extends axially to the stem, and a second portion 81, which extends radially to the stem 4.

Said surface 10 may be located in said first portion 80. Specifically said surface may be located at a closed end of said first portion. The said surface 10 may face the stem 4.

The second portion 81 may be simply a through hole, whose diameter is smaller than that of the first portion 80.

The second portion 81 may extend radially with respect to the axis A of the stem 4.

A longitudinal axis B of the second portion 81 may be inclined either by an angle α with respect to the axis A of the stem 4 or with angle α between a range of 60° and 135° inclusive, preferably 98°.

The second portion 81 may be endowed with a second opening 8B in the first portion 8A, near or at a base of the said conical or pyramidal surface 10.

As already mentioned, the surface 10 may have a truncated cone or truncated pyramid conformation, being therefore endowed with an essentially flat surface facing the cavity 4A, as shown here.

The surface 10 may also have an actual vertex or apex facing the said cavity. In this case, it can be considered to be a cone or a pyramid.

An axis of the cone or pyramid (but also of the truncated cone or the truncated pyramid) may coincide with an axis A of the stem.

To improve dispersion of the fluid substance, the surface 10 may be endowed with a surface groove S which extends between the part near the stem and the base, optionally between the part near the stem and the said second opening 8B.

Figure 5:
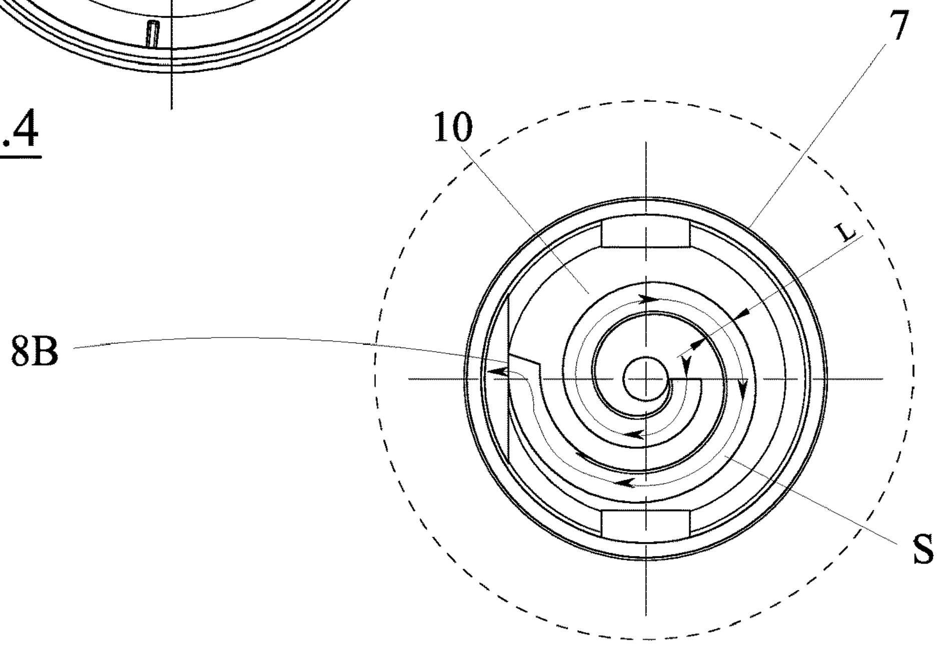
FIG. 5 is an enlarged view of the detail circled in FIG. 4.
Figure 9:
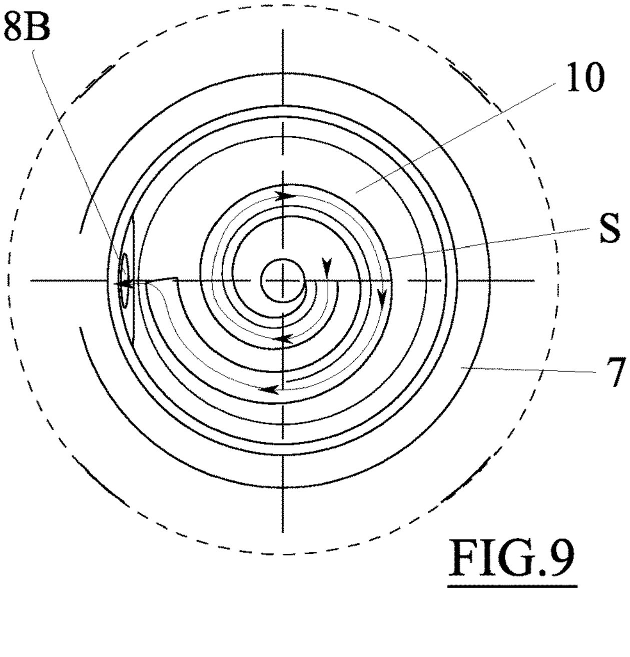
FIG. 9 is an enlarged view of the detail circled in FIG. 8.

The groove can advantageously open (or end) directly at the second opening 8B, as shown in FIG. 5 or 9.

In this way, the groove can efficiently convey the fluid substance towards the second portion 81 of the dispensing channel.

It has been found that with a surface groove S configured as a spiral whose radius increases towards the base, excellent results are obtained in terms of dispersion of the fluid substance and turbulence during dispersion.

It has also been found that the present invention provides comparable or superior results (in terms of aerosol homogeneity) to those obtained using dispensers equipped with a pad.

In the embodiments described, it has been found that an opening angle β of the conical or pyramidal surface of between 60° and 80° gives good results, and even better results if the angle is between 65° and 75°, more preferably 70°.

It has also been found that the ratio between the depth P and the width L of the groove may be between 0.6 and 6.66.

The groove width L can be between 0.15 mm. and 0.5 mm, while its depth P may be between 0.3 mm and 1.0 mm.

The spiral groove S (which is obviously three-dimensional) may also comprise a number of turns comprised between 0.5 and 3, preferably 1.5 turns (as shown in FIGS. 5 and 9).

Various embodiments of the innovation have been disclosed herein, but further embodiments may also be conceived using the same innovative concept.

The invention claimed is:

1. Device (1) for dispensing a fluid substance (5), comprising:

- a container (2) in which the fluid substance (5) is housed;
- a valve (3) or a manual pump (3A) equipped with a hollow stem (4) movable between at least a first position in which the fluid substance is delivered (5) through its a cavity (4A) and a second position in which delivery of the fluid substance is prevented through the its cavity (4A);
- a dispenser button (7) sealed to a top of the hollow stem (4) so that a pressure on said button (7) moves the hollow stem (4) between said second and said first position;
- wherein the dispenser button (7) includes a surface (10) facing the cavity (4A) of the hollow stem (4);
- wherein the dispenser button (7) further defines an annular sidewall extending from the surface (10) on a first end toward the container at a second end;
- wherein the dispenser button (7) further defines a delivery channel (8) equipped with a first opening (8A) on a free surface of the device (1), the delivery channel comprising a first portion (80) extending axially with respect to the stem (4), and a second portion (81) extending radially with respect to the stem (4) and through the annular sidewall of the dispenser button;
- wherein the surface (10) is conical or pyramidal, tapered towards the cavity of the hollow stem;
- wherein said surface (10) is located in said first portion (80) of the delivery channel;
- wherein the second portion (81) is provided with a second opening (8B) on the first portion (80), near or at a base of said conical or pyramidal surface (10); and
- wherein the surface (10) is provided with a surface groove(S) extending between a part close to the stem and the base.

2. Device according to claim 1, wherein the surface (10) has a truncated cone or truncated pyramid shape.

3. Device according to claim 1, wherein the surface (10) is a pyramid or a cone, with a vertex facing said cavity.

4. Device according to claim 3, wherein an axis of the cone or of the pyramid coincides with an axis (A) of the stem.

5. Device according to claim 1, wherein the surface groove(S) has a spiral or spiral configuration with a radius increasing towards the base.

6. Device according to claim 1, in which a longitudinal axis of the second portion (81) is inclined of an angle (a) with respect to the axis (A) of the stem (4).

7. Device according to claim 1, in which the button is completely supported by the stem (4A) or in which the button is hinged to a base fixed to the container (2).

8. Device according to claim 1, in which the button (7) is formed in a single piece.

9. Device according to claim 2, wherein an axis of the truncated cone or of the truncated pyramid coincides with an axis (A) of the stem.

* * * * *